United States Patent [19]

Juy

[11] 4,205,558
[45] Jun. 3, 1980

[54] METHOD AND MEANS FOR MOUNTING AND CONTROLLING CHANGE SPEED GEARS AT THE REAR WHEEL AND THE CRANK-WHEEL OF A BICYCLE OR SIMILAR VEHICLE

[76] Inventor: Henri Juy, 2 boulevard Clemenceau, 21000 Dijon, France

[21] Appl. No.: 929,128

[22] Filed: Jul. 28, 1978

[30] Foreign Application Priority Data

Aug. 2, 1977 [FR] France .............................. 77 24569

[51] Int. Cl.² .................. F16H 9/00; F16H 11/00; F16C 1/10
[52] U.S. Cl. ................................ 74/217 B; 74/217 S; 74/489; 74/501 R
[58] Field of Search .............. 74/217 B, 217 S, 501 R, 74/488, 489, 217 C

[56] References Cited

U.S. PATENT DOCUMENTS

| | | | |
|---|---|---|---|
| 3,181,391 | 5/1965 | Juy | 74/523 |
| 3,426,614 | 2/1969 | Brilando et al. | 74/501 |
| 3,693,469 | 9/1972 | Ozaki | 74/489 |
| 3,924,487 | 12/1975 | Huret et al. | 74/489 |
| 4,046,025 | 9/1977 | Ozaki | 74/501 R |
| 4,066,154 | 1/1978 | Ross | 74/489 X |

FOREIGN PATENT DOCUMENTS

| | | | |
|---|---|---|---|
| 177681 | 7/1953 | Austria | 74/489 |
| 2714525 | 10/1977 | Fed. Rep. of Germany | 74/488 |
| 984436 | 7/1951 | France | 74/217 B |
| 1021893 | 12/1953 | France | 74/217 B |
| 443943 | 1/1949 | Italy | 74/489 |
| 685 | of 1909 | United Kingdom | 74/489 |
| 278403 | 10/1927 | United Kingdom | 74/501 |
| 667909 | 3/1952 | United Kingdom | 74/217 B |
| 906492 | 9/1962 | United Kingdom | 74/489 |
| 1455707 | 11/1976 | United Kingdom | 74/217 B |

*Primary Examiner*—Leslie Braun
*Attorney, Agent, or Firm*—Haseltine, Lake & Waters

[57] ABSTRACT

A method and apparatus for the control of respective speed change gear units at the rear wheel and crank-wheel of a bicycle comprising two pivotable levers mounted on the bicycle each including an integral bearing with a groove therein. A cable is associated with each of the speed change gear units and is operatively coupled in the groove of a bearing of a respective pivotal lever. The cables are wound on the respective bearing of the levers in opposite directions as viewed from the same side of the bicycle such that when the levers are pivotably moved in one direction, one cable is pulled in tension and the other cable is released. The gear units each have a plurality of gears arranged in stepped order and include a shift member which is resiliently biased in opposition to the pull of the associated cable such that when the levers are pivotably moved in one direction, shifting of the gears is effected from the smaller to the larger gears in each unit whereas when the levers are pivotably moved in the opposite direction, shifting of the gears is effected from the larger to the smaller gears of each unit.

10 Claims, 5 Drawing Figures

METHOD AND MEANS FOR MOUNTING AND CONTROLLING CHANGE SPEED GEARS AT THE REAR WHEEL AND THE CRANK-WHEEL OF A BICYCLE OR SIMILAR VEHICLE

FIELD OF THE INVENTION

This invention relates to a method and apparatus for mounting and controlling change speed gears at the rear wheel and the crank-wheel of a bicycle or similar vehicle; bicycles and other vehicles equipped in accordance with such method and/or apparatus are also included within the scope of the invention.

PRIOR ART

Bicycles and similar vehicles are normally equipped with two gear shift devices: one on the rear wheel and one on the crank-wheel, for the purpose of shifting the chain on the sprockets of the rear wheel and on the toothed wheels of the crank-wheel. The various combinations of the positions of the chain on the sprockets and the toothed wheels offer many possibilities for the cyclist to adapt his or her effort in accordance with the contour of the road by selecting an appropriate gearing, i.e. the distance covered for each complete revolution of the crank-wheel.

The control means of the two gear shift devices, in the form of levers or equivalent members by which the control cables are shifted, are secured to the frame of the bicycle generally on either side of the tube that connects the crank-wheel to the handle-bar. One of the control cables is guided to the transverse shifting system of the chain for the rear gear shift device. The other control cable is guided to the transverse shifting system of the chain for the crank-wheel gear shift device.

The levers are pivoted in one direction to "pull" the control cables, and in the other direction to release the cables which are returned by the appropriate spring means of the gear shift devices.

Generally, the levers are so pivoted that the cables are pulled to shift the chain from the smaller to the larger sprocket of the rear wheel, and from the smaller to the larger toothed wheel of the crank-wheel. However, the sprockets of the rear wheel and the toothed wheels of the crank-wheel are stepped in reverse order relative to the frame of the bicycle. The small sprocket of the rear wheel is adjacent to the fork of the frame, and the small toothed wheel of the crank-wheel is adjacent to the frame.

The directions for pivoting the two control levers for the two gear shift devices are therefore opposite.

It frequently happens that cyclists, when they are exerting substantial effort or when they have to be particularly careful for various reasons, or also cyclists who are not familiar with the directions for handling the control levers and the effects produced on the resulting gearings and the corresponding forces to be developed, are mistaken in consequence of this reversal of the control and pivotal directions of the levers of the two gear shift devices. These mistakes result in difficulties, in a "broken" physical effort, in a loss of time, in harmful effects on the mechanisms that are submitted to indesirable stresses, and finally in discouraging those who find it difficult to master such manipulations and to achieve a good practice in bicycle riding.

SUMMARY OF THE INVENTION

It is therefore an object of the invention to provide methods and apparatus which eliminate these disadvantages thoroughly, readily and without undue complications.

A mounting and control method for change speed gears according to the invention is chiefly characterized in that when mounting the intermediate cables and the levers on the frame of the cycle, the cables are wound in reverse order on the bearings integral with the levers, the terminals at the end of said cables being positioned and retained inversely on said bearings or on said levers, so that for the same shifting direction of both levers as seen from the same side of the cycle frame, reverse actions are produced on the two cables, i.e. one of them is pulled while the other one is released or freed, whereby an action in accordance with the winding direction selected is obtained on the systems for the transverse shifting of the two gear shift devices, with a corresponding motion of the chain from the smaller sprocket to the larger one and from the toothed wheel of larger diameter to the toothed wheel of smaller diameter, or conversely.

DETAILED DESCRIPTION

Figure 1:
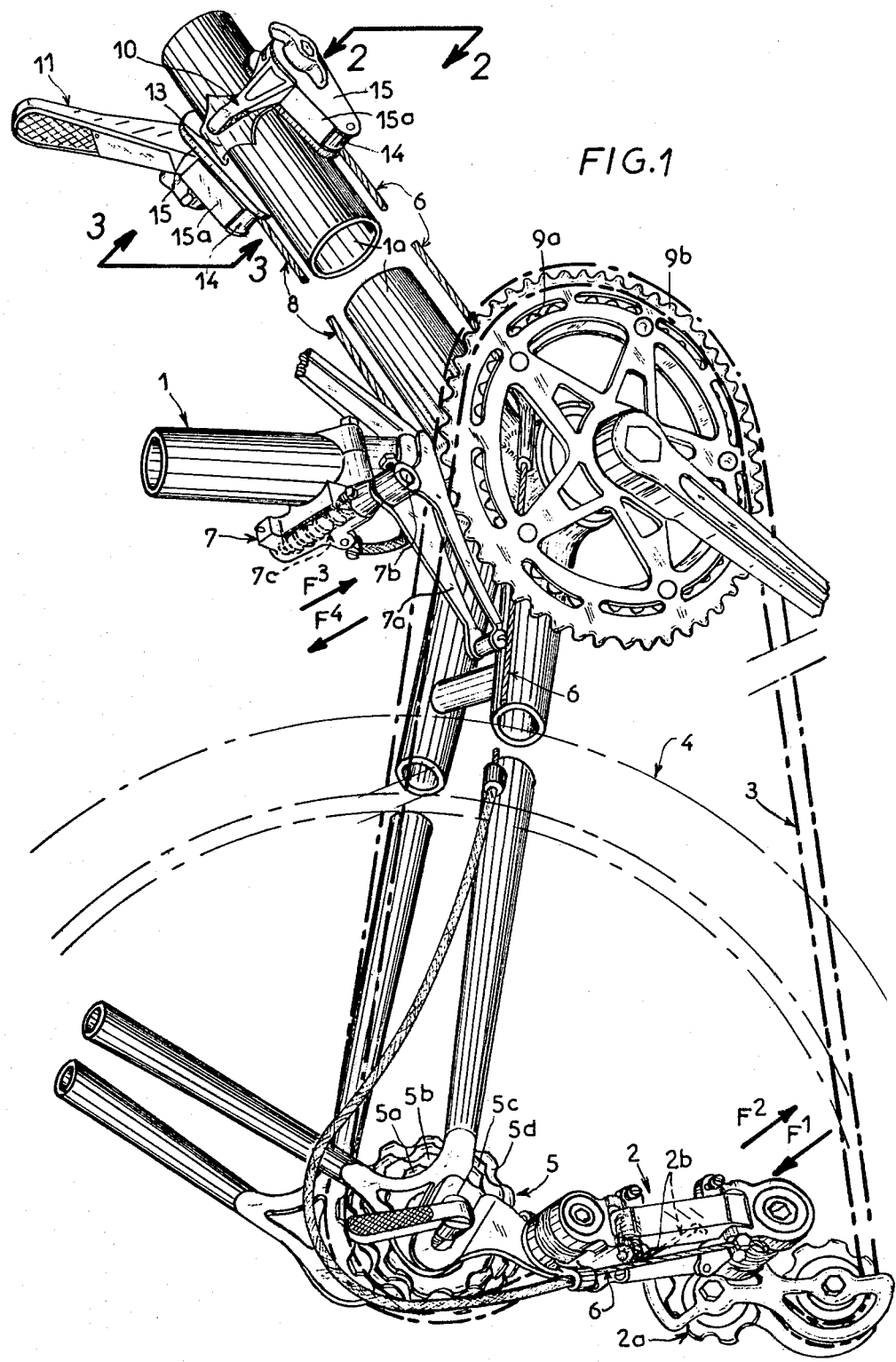
FIG. 1 is a general perspective view illustrating in part a bicycle frame, a free wheel with four sprockets, a rear gear shift device, a forward gear shift device, a crank-wheel with two plates and control levers for the gear shift devices mounted on the bicycle frame.

A frame 1 of a bicycle, equipped with two gear shift devices that are illustrated by way of example only, may be seen in FIG. 1.

The gear shift device 2 at the rear wheel is of the well known design with deformable parallelogram linkage capable of driving a system 2a transversely, the system 2a having flanges and rollers on which a chain 3 is guided. This chain can be shifted transversely together with the system 2a.

The rear wheel 4 of the bicycle is equipped with a free wheel that is generally denoted by reference numeral 5 and is integral in any well known manner with the hub of the rear wheel.

In the example as illustrated, the free wheel has four stepped sprockets with gradually increasing diameters, from the sprocket with smaller diameter 5a to the sprocket with larger diameter 5d, and with intermediate sprockets 5b and 5c therebetween. The free wheel can have more or less sprockets, without altering in any way the characteristics of the invention.

The members of the gear shift device are actuated in a known manner by the cable 6 for shifting the system 2a and the chain 3 transversely in the direction of arrow F1 when the cable is pulled against one or more resilient means (denoted schematically by way of example at 2b). The chain is shifted from sprocket 5a to sprocket 5d.

The cable 6 operates in the opposite direction, when this cable is released by the return action of said one or more resilient means 2b for the transverse shifting of the system 2a and of the chain 3, in the direction of arrow F2, from sprocket 5d to sprocket 5a.

In accordance with the non-limiting example illustrated, the gear shift device 7 at the crank-wheel is of the well known type comprising a fork 7a between the prongs of which the chain 3 is passed. The fork is supported by a pin 7b which is pulled transversely against the action of one or more resilient means, such as spring 7c, by a cable 8.

This pulling effect causes the fork 7a and the chain 3 to be displaced transversely in the direction of arrow F3, the chain passing thereby from the toothed wheel of smaller diameter 9a to the toothed wheel of larger diameter 9b.

Two toothed wheels only at the crank-wheel have been illustrated, but it is well understood that more than two toothed wheels can be mounted without altering any characteristic of the invention.

The cable 8 works in the opposite direction when it is released by the return action of elastic means 7c to displace the fork 7a and the chain 3 transversely in the direction of arrow F4 from the toothed wheel 9b to the toothed wheel 9a.

The cables 6 and 8 are supported and guided along the tubes of the frame, and protected entirely or in part in sheathings in their passage from the gear shift devices 2 and 7 to the control means that are mounted on the frame within reach of the cyclist's hand. In the example illustrated, the control means consists of respective levers 10 and 11 for co-operation with cables 6 and 8. According to the normal practice, these levers are pivotally mounted on pins 12 supported by a collar 13 which is adapted and fixed along the tube 1a connecting the crank-wheel to the handle bar of the bicycle. It will be evident that these levers can be mounted at any other point on the bicycle frame that is within reach of the cyclist. Also, the two levers 10 and 11 are not necessarily mounted pivotally in the same axial alignment.

The levers 10-11 are pivotally mounted on pins 12 with the aid of adjustable frictional means that are well known in their various embodiments, and hence are not illustrated as they are not within the scope of the invention.

The levers 10 and 11 are directly or indirectly integral with bearings 10a and 11a engaged with the pins 12. On the greater part of the circular span of each one of these bearings there is formed generally a groove 10b-11b for the abutment of and for guiding the corresponding cable 6 or 8. The end of the cables is integral in any well known manner with cotter pins 6a-8a respectively. The levers 10-11 are drilled or open for the passage of the cable in prolongation of the grooves 10b-11b, and have in the same center line a chamber or housing 10c-11c in which the respective terminal cotter pin 6a-8a is housed and retained.

Figure 2:
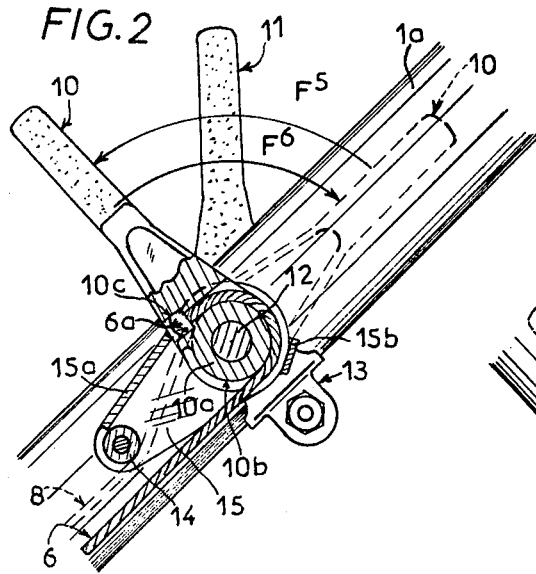
FIG. 2 is a front and a sectional view in part along line 2—2 in FIG. 1, showing the rear gear shift device lever in the position corresponding to the winding of the chain on the larger sprocket of the free wheel, the broken lines illustrating the lever in the opposite position.
Figure 4:
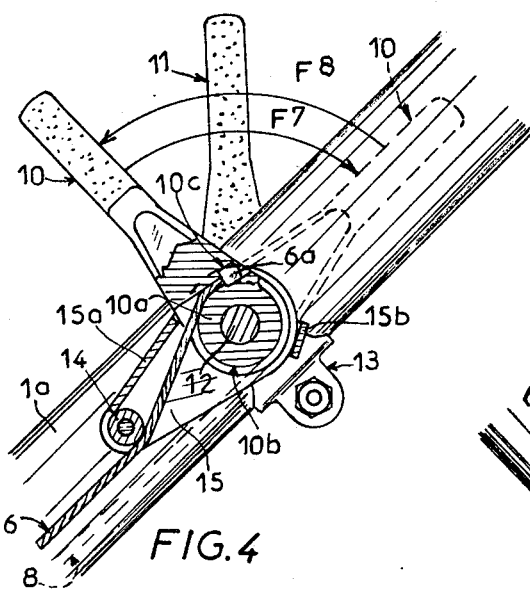
FIGS. 4 and 5 are views similar to FIGS. 2 and 3 respectively, in which the control cables are wound on the lever bearings in reverse order one to another and to the windings illustrated in FIGS. 2 and 3.

In accordance with the invention, the cable 6 is wound on the bearing 10a in the groove 10b as shown in FIGS. 2 and 4. In FIG. 2, the cable 6 is wound on the bearing counterclockwise, while in FIG. 4 the cable 6 is wound clockwise on the bearing.

Figure 3:
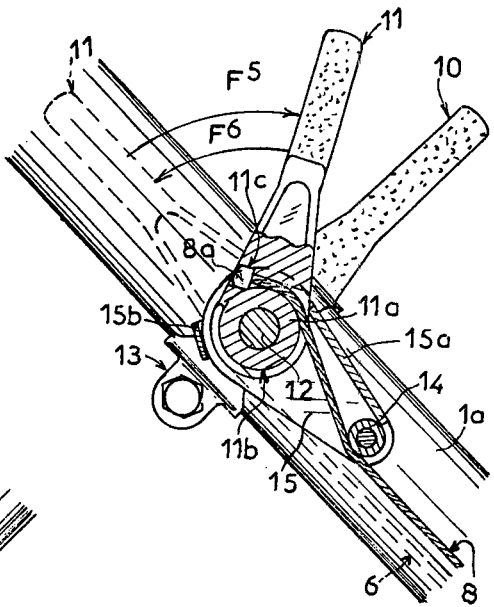
FIG. 3 is a front and a sectional view in part along line 3—3 in FIG. 1, showing the front gear shift device lever in the position corresponding to the winding of the chain on the crank-wheel plate of smaller diameter, the broken lines illustrating the lever in the opposite position.
Figure 5:
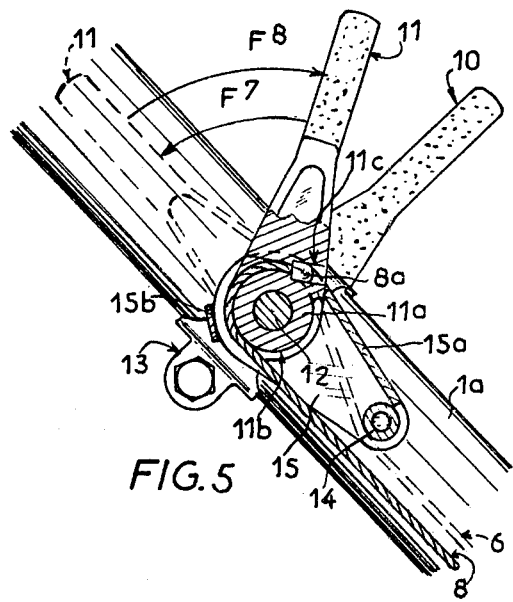

On the other hand, the cable 8 is wound on the bearing 11a in the groove 11b as shown in FIGS. 3 and 5. This winding is opposite to the winding of the cable 6 on the bearing 10a when the two levers, their bearings and the cables are seen from the same side of the frame. The terminal cotter pins of the cables are housed and retained in like manner in the chambers or housings 10c-11c of the levers.

In the arrangement in FIGS. 2 and 3, when either one of the two levers 10 and 11 is pivoted in the direction of arrows F5 by the cyclist pulling these levers toward himself, the cable 6 is pulled and the chain 3 is shifted from sprocket 5a in the direction of sprocket 5d (i.e. the gearing is reduced in order to lessen the muscular effort), while the cable 8 is released and the chain 3 is shifted from wheel 9b to wheel 9a, whereby a similar gearing reduction effect is produced to lessen the muscular effort (in conjunction with the shifting process on the sprockets of the rear wheel). When the lever or levers are pivoted in the direction of arrows F6 by the cyclist pushing these levers back, the opposite effects and results are produced, as will be readily understood.

In the arrangement of FIGS. 4 and 5, when either one of the two levers 10 and 11 is pivoted in the direction of arrow F7 by the cyclist pushing these levers back, the effects and results stated above are produced when the lever or the levers are actuated by the cyclist in the direction of arrow F5 according to the arrangement illustrated in FIGS. 2 and 3. By actuating the levers in the direction of arrow F8, i.e. by pulling them, opposite effects and results, corresponding to those of arrow F6 in the case of FIGS. 2 and 3, are produced by the driver.

Therefore, due to the identical swivelling directions for the control levers of the two gear shift devices to produce the same effects resulting from the gearing modifications desired, the manipulation for gear shifting is made much easier, without apprehension nor groping and with better results, whereby a muscular effort that is smoothly consistent is obtained along with more rational use of the bicycle.

In accordance with the invention, the levers 10 and 11 can be of the same type as described, and they are mounted by mere reversal, for instance on either side of the tube 1a.

Levers of well known design can be used, including conversely two housings or chambers (such as 10c or 11c), and either one is used according to whether the cable is wound in one direction or in the other one. In this case, it is not necessary to turn the lever over for the symmetrical mounting on either side of the tube 1a.

Finally, a fulcrum for the cable is provided in accordance with the winding direction of the cables on the bearings of the levers, for example cable 8 on bearing 11a (FIGS. 3 and 5). This fulcrum is for instance in the form of a roller 14 or rotating pulley. This fulcrum is formed or supported fixedly for instance on a fixed support 15 that can be integral with the collar 13 and/or the pin 12. The fulcrum or roller 14 is adequately spaced from the bearing 10a or 11a, the cable (6 or 8) being retained by this fulcrum substantially in the center line of the tube 1a of the frame along which said cable extends. The main purpose of this arrangement is the pleasant appearance of the mounting. Moreover, there may be seen stops 15a formed on the supports 15 to limit the travel of the levers in the direction of the arrows F5 or F8, as well as stops 15*b* to limit the travel of the levers in the direction of the arrows F6 or F7. The stops 15*a* and/or 15*b* can be adjustable or predetermined in advance in accordance with the number of sprockets and of toothed wheels.

I claim:

1. Apparatus for the control of respective speed change gear units at the rear wheel and crank-wheel of a bicycle, said apparatus comprising two pivotal levers mounted on the bicycle, each lever including a bearing with a groove therein, a cable associated with each of the speed change gear units and operatively coupling each unit with a respective pivotal lever, said cables being wound on the respective bearings of the levers in opposite directions as viewed from the same side of the bicycle such that when the levers are pivotably moved in one direction one cable is pulled in tension and the other cable is released, said gear units each having a plurality of gears arranged in stepped order and including resilient means acting in opposition to the pull of the associated cable such that when the levers are pivotably moved in one direction shifting of the gears is effected from the smaller to the larger gears in one unit and from the larger to the smaller gears in the other unit whereas when the levers are pivotably moved in the opposite direction shifting of the gears is effected from the larger to smaller gears of said one unit, and from the smaller to the larger gears of the other unit, the opposite direction of winding of the cables acting in combination with the stepped order of the gears at the rear wheel and crank wheel to cause the gear ratio to be increased when either lever is rotated in a first direction and to be decreased when either lever is rotated in the opposite direction.

2. Apparatus as claimed in claim 1 wherein the bicycle includes a tube and means mounting said levers symmetrically on opposite sides of said tube.

3. Apparatus as claimed in claim 2 wherein each cable is wound in a respective groove of the bearing of the associated lever.

4. Apparatus as claimed in claim 3 wherein each bearing has a hole following the respective groove, each said cable having an end secured in a respective hole.

5. Apparatus as claimed in claim 4 wherein said levers are of identical construction with two of said holes at the ends of each groove, said levers being interchangeably mounted on opposite sides of the tube.

6. Apparatus as claimed in claim 5 comprising a fulcrum mounted fixedly on the bicycle and engaging the cable extending from a respective lever to its associated gear unit for maintaining said cable substantially centrally with respect to said tube.

7. Apparatus as claimed in claim 6 wherein said fulcrum comprises a rotatable member.

8. A method of mounting and controlling the change speed gears at the rear wheel and the crank-wheel of a bicycle, said method comprising mounting two intermediate cables and two levers on opposite sides of the frame of the bicycle for respectively operating the change speed gears at the rear wheel and the crank-wheel of the bicycle, winding the cables in opposite directions on bearings integral with the respective levers, and securing the ends of said cables at opposite positions on said bearings to produce reverse effects on the two cables for the same angular direction of movement of the two levers as seen from the same side of the bicycle frame whereby one of said cables is pulled under tension while the other cable is released, and actuating, in accordance with the winding direction selected, transverse shifting system of the two change speed gears to shift the chain from the smaller sprocket to the larger one at the rear wheel and from the toothed wheel of larger diameter to the toothed wheel of smaller diameter at the crank-wheel, or conversely so that the gear ratio is respectively increased when either lever is rotated in one angular direction and respectively decreased when either lever is rotated in the opposite direction.

9. A method as claimed in claim 8 wherein when viewing the bicycle from the side of the control for the rear wheel shift device, said winding of the cable is effected counter-clockwise on the control lever for the rear wheel shift device, and clockwise on the control lever for the crank-wheel shift device, the cables being thereby actuated reversely by the driver when pulling or pushing the levers in the same angular directions.

10. A method as claimed in claim 8 wherein when viewing the bicycle from the side of the control for the rear wheel shift device, said winding of the cable is effected clockwise on the control lever of the rear wheel shift device and counter-clockwise on the control lever of the shift device for the crank-wheel, the cables being thereby actuated reversely by the driver when pulling or pushing the levers in the same angular directions.

* * * * *